United States Patent [19]

Paustian

[11] Patent Number: 5,624,592
[45] Date of Patent: Apr. 29, 1997

[54] MICROWAVE FACILITATED ATMOSPHERIC ENERGY PROJECTION SYSTEM

[75] Inventor: Philip J. Paustian, Panama City, Fla.

[73] Assignee: Cerberus Institute for Research and Development, Inc., Warner Robins, Ga.

[21] Appl. No.: 325,616

[22] Filed: Oct. 19, 1994

[51] Int. Cl.$^6$ .................................................. H05B 6/80
[52] U.S. Cl. ........................ 219/679; 219/687; 219/746; 361/117; 333/1; 315/39; 315/111.21
[58] Field of Search .................... 219/679, 687, 219/745, 746, 690, 693, 695, 702; 361/117, 118, 119; 333/1; 315/39, 111.01, 111.21

[56] References Cited

U.S. PATENT DOCUMENTS

| | | |
|---|---|---|
| 3,083,528 | 4/1963 | Brown ..................................... 219/687 |
| 3,148,302 | 9/1964 | Clavier et al. . |
| 3,584,260 | 6/1971 | Barbini . |
| 4,017,767 | 4/1977 | Ball . |
| 4,207,452 | 6/1980 | Arai ........................................ 219/687 |
| 4,634,992 | 1/1987 | Brown . |
| 4,652,694 | 3/1987 | Goldman et al. . |
| 4,814,720 | 3/1989 | MacPhail et al. . |
| 5,107,086 | 4/1992 | Yangas ..................................... 219/679 |
| 5,175,664 | 12/1992 | Diels et al. . |
| 5,206,471 | 4/1993 | Smith ....................................... 219/687 |
| 5,252,178 | 10/1993 | Moslehi ................................... 156/643 |
| 5,471,115 | 11/1995 | Hikosaka ............................ 315/111.21 |

OTHER PUBLICATIONS

Watkins et al., "A 60 GHz GaAs Fet Amplifier", 1983 IEEE MTT's Digest, pp. 145–147.

*Primary Examiner*—Philip H. Leung
*Attorney, Agent, or Firm*—James Creighton Wray

[57] ABSTRACT

The Atmospheric Energy Projection System (AEPS) is a means to project electrical/thermal energy using microwave radiation at the resonant frequency of oxygen. The radiation excites a column through the ambient atmosphere to a temperature such that air within the column is converted from an insulator to a conducting channel or focused medium. An electrical current is subsequently applied to the channel to transmit an electric charge a predetermined distance. Rapid release of pulses of 60 GHz microwave radiation at a field strength below that for breakdown for the waveguide feeding the antenna or at the antenna aperture creates a channel without premature plasma generation. Once the channel is energized sufficiently, an electric charge is released into the channel and flows down it from the source to whatever solid the channel intersects. If no solid intrudes the charge diffuses harmlessly at the end of the heated channel as the channel cools back to the ambient temperature. Channel duration is a function of cross-sectional area, and channel length is a function of the amount of 60 GHz microwave energy radiated into the volume of interest. The radiated energy to make the channel in turn is a function of the power available and microwave source used. Shorter ranges require less power to create the channel. The amount of electrical charge released on the channel is dependent on the desired range and the amount of energy needed for the task at the end of the channel.

28 Claims, 3 Drawing Sheets

MICROWAVE FACILITATED ATMOSPHERIC ENERGY PROJECTION SYSTEM

BACKGROUND OF THE INVENTION

The present invention relates to a system for projecting thermal and electrical energy that has numerous applications.

Hand-operated devices for crowd control and criminal apprehension have limited range. "Stun guns" are only effective against aggressors in close contact with a victim. Police batons and other devices used by officers require proximity to the criminal. Security fences for containing crowds and subduing rioters must be manually positioned and are not capable of mobile operation. Needs exist for law enforcement devices and systems having long range, quick action and mobile operation.

Military operations are easily frustrated by complex radar systems. Offensive efforts to destroy or inactivate enemy weapons and systems are intercepted and defeated. Needs exist for military devices and systems capable of high speed delivery that will not give a defense system time to detect and respond.

Agricultural activities, such as cattle herding, are highly inefficient. The number of cattle a single herder can handle is limited. Cattle tend to wander outside of a herder's reach and predators quickly attack herds before the herder can react. Devices that permit remote operation would increase efficiency, as more cattle could be handled by a single herder as a greater area of control and protection is established.

Needs exist for means of preventing catastrophes resulting from lightning. Facilities sensitive to lightning strikes need systems that not only detect potential storms but also channel the lightning from the atmosphere to a safe location for discharge.

Protection systems for homes and offices provide adequate detection of intruders but do not assist in trespasser apprehension. A means for temporarily disabling an intruder would increase the number and decrease the time needed to apprehend the criminal.

Needs have long existed for perfect communication channels having zero interference and noninterceptability.

SUMMARY OF THE INVENTION

The present invention relates to an Atmospheric Energy Projection System (AEPS) for projecting electrical and thermal energy. The system takes advantage of oxygen's resonant frequency for absorption of energy. AEPS uses microwave radiation at 60 GHz to create a narrow channel of excited molecules heated sufficiently such that a charge released into that excited air column tends to follow the column rather than dissipating more diffusely into the ambient air. That frequency is the resonant frequency of oxygen. Transmitting 60 GHz microwaves into a narrow air column increases energy in gas molecules in just that portion of the air. Electron mobility in the gas energized by the microwave beam increases, thus favoring the flow of current down the narrow column or channel rather than through the surrounding cooler air. AEPS first excites the gas almost to the air breakdown level, and then introduces electric charge into the channel. That creates controlled breakdown with the flow of electrons proceeding down the channel at a speed approaching one-fifth the speed of light or slightly better. The electric charge continues down the channel until it contacts the object of interest. If no solid encroaches in the column, the electric charge diffuses harmlessly.

AEPS has numerous potential applications in a variety of fields, including its development into devices used in military operations. At high power, AEPS delivers hundreds of amps of current to land, water or airborne targets, thereby confusing and immobilizing advanced technology. The electric charge delivered using AEPS's travels at one-fifth the speed of light, making evasion difficult. Ground forces can use AEPS for destroying or inactivating controlled directed electronic counter measures (ECM). At low powers, the present invention can be used to perform agricultural activities, such as herding livestock. AEPS's, having a longer range than a cattle prod, allow one ranch hand to more efficiently control a herd. Devices can also be developed to defend grazing cattle and sheep against predators. Properly tuned, an AEPS mechanism merely stings or stuns the predator and thus avoid killing an endangered species or domestic animal.

An array of AEPS sources can be used to fence off areas from human or animal passage. That fence is visible as streaks of lightning passing between the two AEPS sources. The amount of charge carried by the fence is adjustable so as to merely stun or mildly shock an imprudent observer who chooses to proceed through the fence. The requisite charge is realized by applying enough voltage to achieve breakdown in the air in the channels that would be reformed rapidly. Multiple channels a few centimeters apart created by an array of 60 GHz microwave sources and charge sources aligned in a column and radiating in the same plane creates such a barrier. Similarly, high security areas can be equipped with AEPS's in doorways and hallways to instantly create a barrier to human, animal or automated system passage. The current is adjustable upwards from mild pain to a power sufficient to stun a man or animal, leaving the interloper temporarily unconscious or disabled. AEPS's can also be incorporated into home security systems to augment home defenses against unwanted intruders.

In the field of criminal enforcement, the present invention can be used by police officers to stun and subdue rioters and criminals without inflicting lasting injury. AEPS is far more directional, easier to control, less toxic, and environmentally safer than tear gas, the weapon commonly employed in those situations. Mounting a column of AEPS's on trucks creates a mobile curtain of charge between the trucks themselves and buildings along the street, compelling rioters to move along or be shocked.

Focusing the AEPS channel on thunder clouds allows lightning to be discharged in a predictable manner. Lightning is directed down the channel to a safe ground or to appropriate energy storage devices, such as banks of capacitors, batteries, or water directly heated to steam to move a turbine to regenerate electricity in a controlled fashion. Airports, chemical plants, NASA launch facilities and other structures at risk from catastrophic damage from lightning strikes can use AEPS's to predictably discharge storms.

For secured communications, a communication corridor can be established by a series of parallel microwave link channels of breakdown forming a hollow circle or rectangle surrounding an unexcited or normal air core. In the air core, a communication carrier, like radio, microwave, laser or emitter pulse, is established. Perfect communication having zero interference and noninterceptability results. The signal sent down the air core is not capable of being picked up by observers outside the core due to absorption and reflection of the signal by the air breakdown occurring around the signal. Further, efforts to read the beam by interposing another beam and interpreting interference patterns is also futile due to absorption and reflection, similar to what occurs when microwaves routinely reflect off the ionosphere. Additional signal security is obtained at the receiving end as the air core is oscillated slightly with coded instructions for matching oscillations by the reception unit.

These and further and other objects and features of the invention are apparent in the disclosure, which includes the above and ongoing written specification, with the claims and the drawings.

DETAILED DESCRIPTION OF THE DRAWINGS

Figure 1:
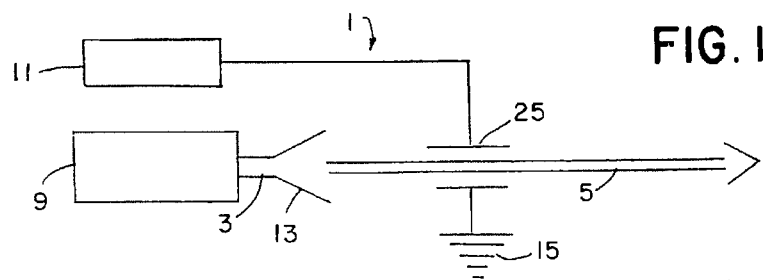
FIG. 1 is a process diagram for the Atmospheric Energy Projection System.

Referring to the drawings and to FIG. 1, the Atmospheric Energy Projection System (AEPS) 1, using microwave radiation at 60 GHz by way of a waveguide 3, takes advantage of oxygen's absorption at oxygen's resonant frequency to create a narrow channel 5 of excited molecules heated to 4000 degrees Kelvin. An electric current is then placed onto the channel 5, and an electric charge is transmitted a predetermined distance along the channel 5.

At 4000 degrees Kelvin dry air has a conductance of about 1 mho/meter. At 2000 degrees Kelvin dry air is an insulator with a conductance of $10^{-6}$ mho/meter. Between 2000 and 4000 degrees Kelvin dry air becomes a fairly good conductor. Upon increasing the energy in the oxygen molecules in the narrow channel 5 of air by transmitting 60 GHZ microwaves into the channel 5, electron mobility in the oxygen within the beam increases, thereby favoring the flow of current down the channel 5 rather than through the cooler surrounding air. AEPS 1 uses the 60 GHz microwave pulses to excite the oxygen molecules almost to the air breakdown energy level immediately before the electric charge is released into the channel. That creates controlled breakdown with the flow of electrons proceeding down the channel 5 at a speed approaching one fifth the speed of light or slightly better. AEPS 1 can either release a charge into the channel 5 at the end of the pulses or during an interval when the system 1 is not pulsing, such as during the 20 to 40 microsecond lull between 50 microsecond pulses.

The excited channel 5 of air takes a finite amount of time to re-equilibrate with the surrounding air. Lightning data demonstrates that a 1 cm radius channel 5 once heated to 4000 degrees Kelvin conducts for 50 microseconds before heat transfer converts the channel 5 back to an insulator. A larger diameter channel 5 takes longer to decay, but requires more energy to create.

As shown in FIG. 1, preferred embodiments of the invention 1 have a transmitter 9 for generating microwave pulses, an electric charge source 11, a waveguide 3, an antenna 13 and a ground 15.

The microwave can be generated by any of a number of transmitters 9 depending on operational requirements. Multiple gallium arsenide monolithic microwave integrated circuit 60 GHz amplifiers or high electron mobility transistor amplifiers can be coupled to generate the microwave pulses for channel creation for many moderate power applications. For higher power channels one or a small group of 60 GHz Gyrotron tubes such as a gyromonitron oscillator, a gyrotron based traveling wave tube amplifier (GyroTWT), or a gyroklystron amplifier can be used to put out 100 to 120 joules per pulse or better. A large array of 60 GHz Klystron amplifiers or 60 GHz Magnetron amplifiers operating at near their maximum power outputs can also be combined to supply higher power microwave pulses for longer ranges.

The selection of a source 11 of electric discharge for keeping the channel 5 open and for providing a current source is dependent on the predetermined distance of current travel and projected energy delivery. AEPS can use modified spark plugs, tesla coils, arc welding nozzles, banks of charged capacitors, or other current source 11 to deliver charge to the channel 5. In one embodiment, a Marx bank is used to release large charges rapidly and predictably. A Marx bank is a bank of capacitors that are charged in parallel and discharged serially.

Power requirements for generating 60 GHz microwaves depend on the desired range, the channel 5 diameter, and the channel 5 temperature before discharge. Some conservative estimates are as follows:

| channel radius | channel length | Energy required to create channel of 4000K |
| --- | --- | --- |
| air | | |
| 0.01 m | 4 m | 6.48 kilojoules (KJ) |
| 0.01 m | 20 m | 32.4 KJ |
| 0.01 m | 40 m | 64 KJ |
| 0.01 m | 41,284 m | 677,922 KJ |

These energy requirements are based on worst case scenarios modeling the atmosphere as just oxygen and nitrogen and supplying enough energy to the oxygen and neighboring nitrogen molecules to heat all the molecules to 4000 degrees Kelvin. AEPS 1 does not require that the energy put in the channel 5 completely constitute microwaves.

Once some gradient is established, electrical discharges along the channel 5 are pushed through the atmosphere through the favored pathway. The discharges, by rapidly flowing in the channel 5, heat the channel 5 and reduce resistance. AEPS 1 is more efficient than natural lightning, because the invention creates the channel 5 of excited molecules directly by exciting oxygen at its resonant frequency. That provides a straight path offering a low resistance to current and avoiding the changes in direction normally observed with lightning.

The anticipated range for AEPS 1 operating on the ground is from meters to 41 kilometers. With sufficient energy from an airborne source, that range can be further increased. The actual range of the invention is dependent on the power delivered to create the channel 5, the electric discharge available to keep the channel 5 open and travel along the channel 5, and the channel 5 radius required for carrying the desired current. Lightning data demonstrates that a 1 cm radius channel 5 easily can carry a current of 100 Amps.

Figure 2:
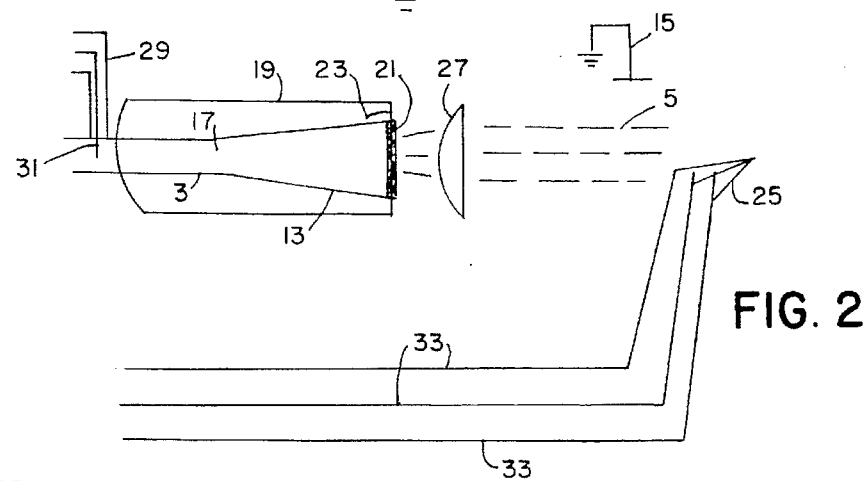
FIG. 2 is a more detailed diagram of the system showing a waveguide, a horn antenna, a microwave lens and an electrode.

FIG. 2 shows a preferred embodiment of the present invention having a $WC_{80}$ waveguide 3 and a conical horn antenna 13 connected to the waveguide 3 at the conical horn aperture 17. To increase the energy applied per pulse without breakdown occurring in the waveguide 3, the waveguide 3 and antenna 13 assembly is filled with a more inert gas, like $N_2$ or $SF_6$, at pressures greater than atmospheric pressure. The waveguide 3 is pressurized to allow higher power pulses for more rapid channel 5 construction and longer range. When a conical horn antenna 13 having an aperture 17 of 4.048 cm is used, 120 joules can be expended over 6.32 microseconds, which is equivalent to 19 MW. Sealing the system 1 and pressurizing the waveguide 3 with inert gases increases pulse power but also increases heat, resulting in a need for external cooling. In one embodiment, a cooling jacket 19 for water cooling is fitted around the waveguide 3 and conical horn antenna 13, as shown on FIG. 2. The embodiment of the system 1 shown in FIG. 2 has a transparent window 21 positioned on the outer edge 23 of the conical horn antenna 13. A microwave lens 27 positioned between an electrode 25 and the conical horn antenna 13 reduces divergence of the channel 5. A first set 29 of coaxial cables extends from a transmitter 9 to an antenna probe 31 in the waveguide 3. A second set 33 of coaxial cables extends from the electric charge source 11 to an electrode 25 positioned in the channel 5. The lens 27 can be rotatable for altering charge transmission.

Figure 3:
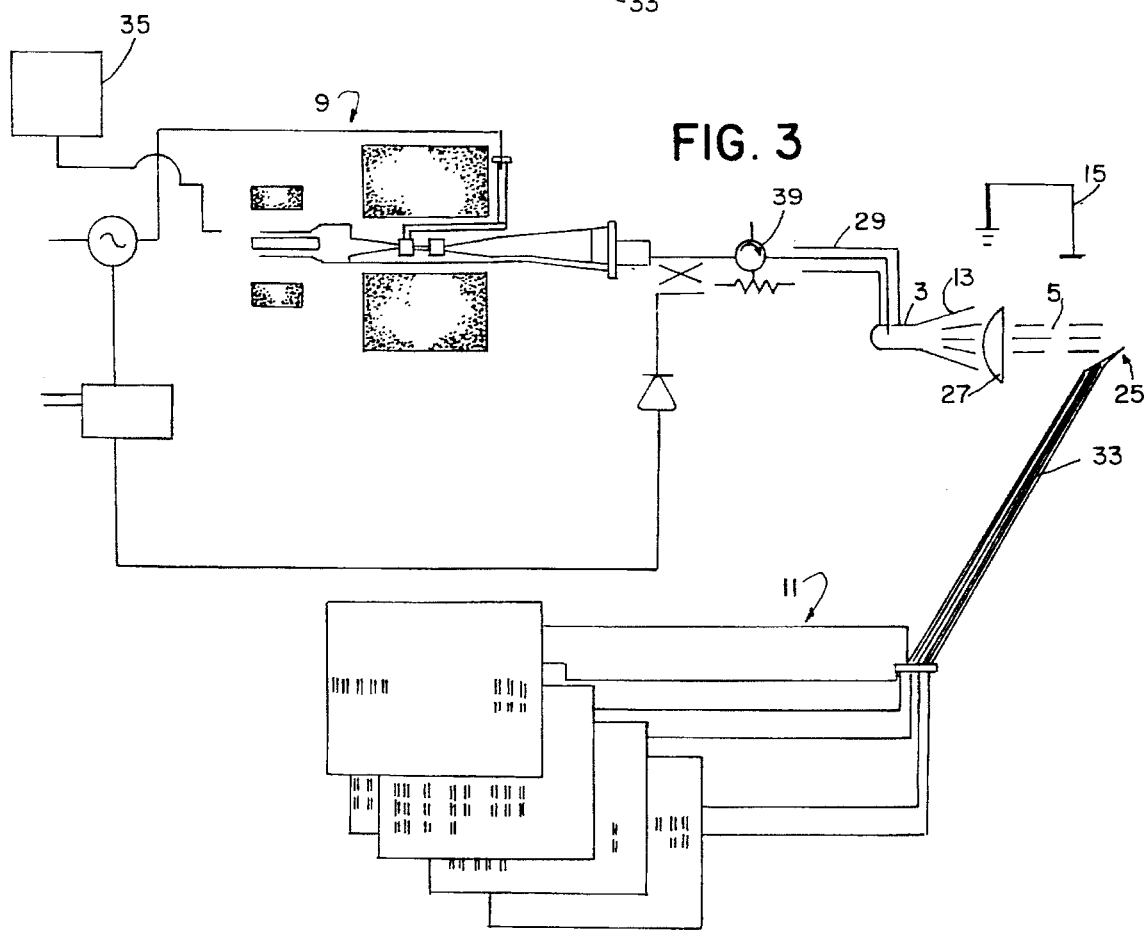
FIG. 3 is a preferred embodiment of the system having a gyroklystron amplifier for generating the microwave pulses for channel creation.

FIG. 3 shows an AEPS 1 having a Gyrotron as the transmitter 9. In that embodiment, the Gyrotron is a Gyroklystron. Other Gyrotrons, like GyroTWT and Gyromonitron, can be substituted. The Gyrotron, which is connected to a power supply 35, generates and transmits microwave pulses to a waveguide 3 through the first set 29 of cables. The pulses propagate through the waveguide 3 and connected conical horn antenna 13 and pass through a microwave lens 27. The lens 27 reduces divergence, resulting in a narrow pulsed 60 GHz microwave beam channel 5. A release electrode 25 that is connected to a charge source is positioned on the beam channel 5. The embodiment of the invention 1 shown in FIG. 3 has a Marx bank of capacitors as the charge source 11. Once sufficient energy has been applied to the channel 5 to create the channel 5 with the desired distance, charge is released into the channel 5 by the Marx Banks. A ground plate 15 is located close to the channel 5 to provide a path for a released charge, should the channel 5 not be present when the charge is released. In that situation, the charge jumps from the releasing electrode 25 to the ground plate 15 and spares challenge to the circulator 39 in the transmitter 9.

Figure 4:
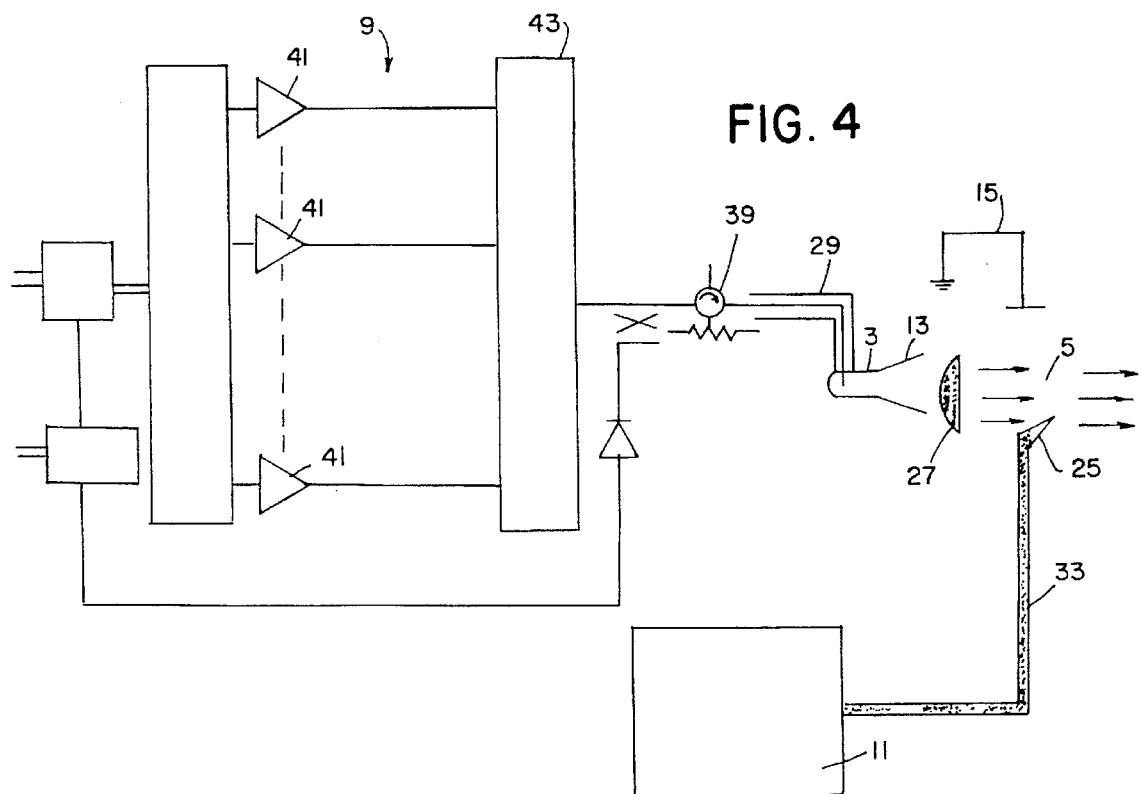
FIG. 4 is a preferred embodiment of the system having multiple 60 GHz solid-state amplifiers for generating the microwave pulses for channel creation.

The transmitter 9 can be solid state microwave amplifiers, as shown in FIG. 4, rather than tube based sources. Multiple solid state 60 GHz amplifiers 41, like gallium arsenide microwave monolithic integrated circuit amplifiers and high electron mobility transistor amplifiers, can be combined to achieve necessary power output. The output from each amplifier 41 is merged in a combiner 43 and is delivered to the waveguide 3.

Figure 5:
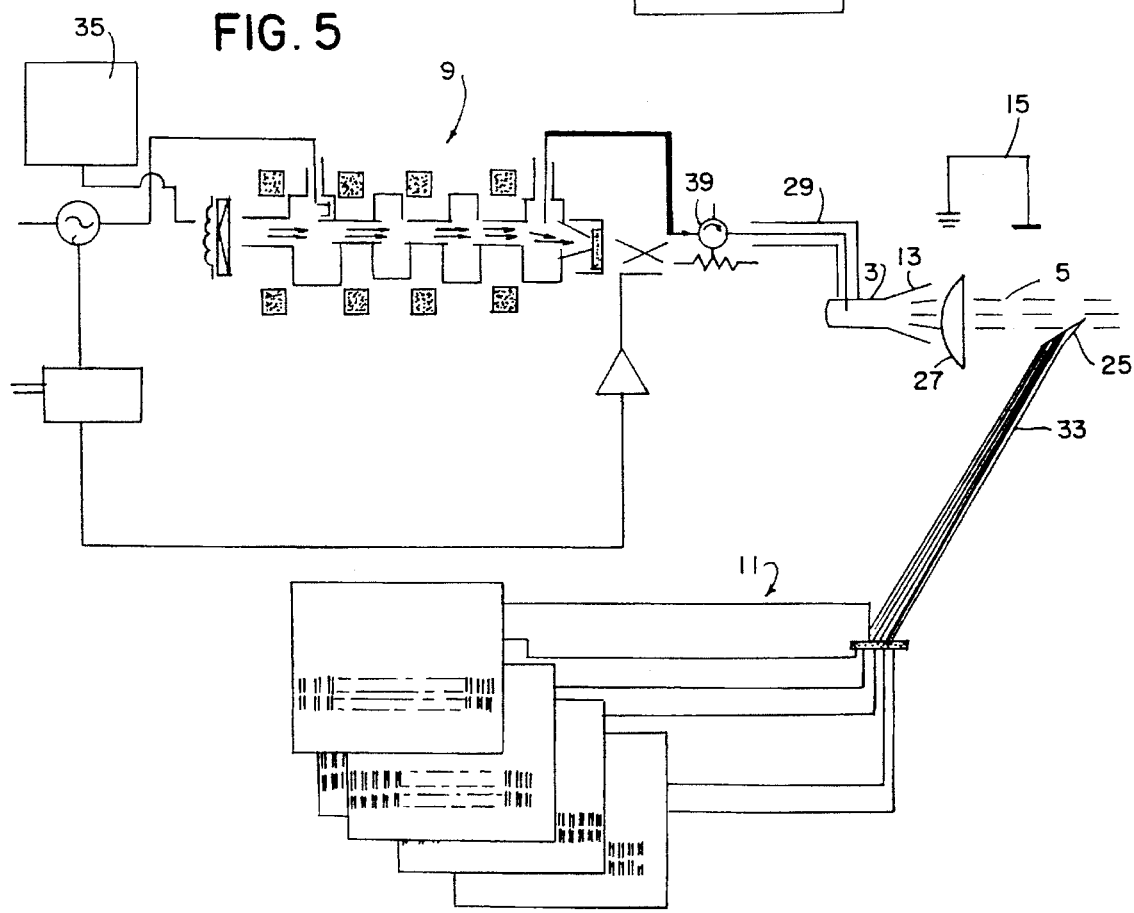
FIG. 5 is a preferred embodiment of the system having a multi-cavity 60 GHz Klystron amplifiers for generating the microwave pulses for channel creation.

FIG. 5 shows another preferred embodiment of the system 1 having a 60 GHz Klystron as the transmitter 9.

Figure 6:
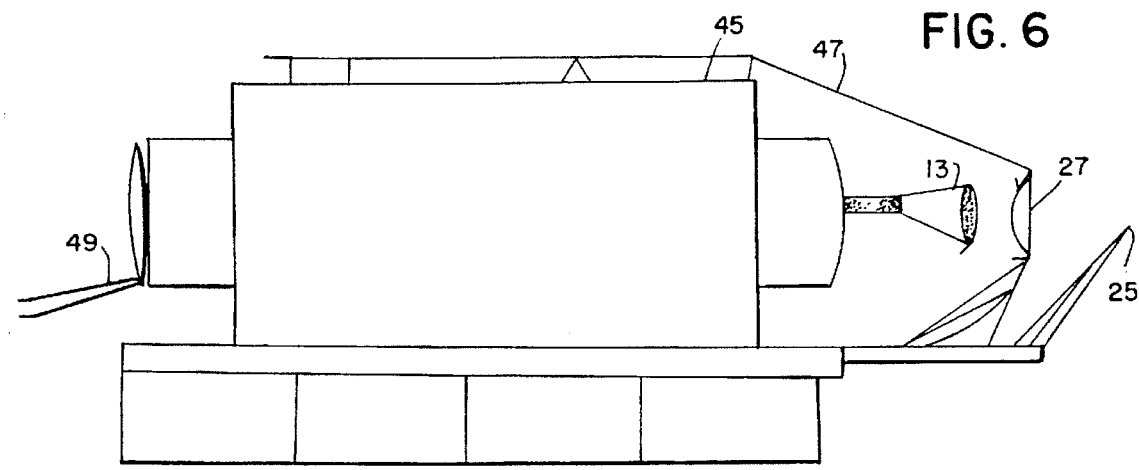
FIG. 6 is a side view of a gyroklystron amplifier shielded against the elements with a microwave lens suspended between the horn antenna and the electrode.
Figure 7:
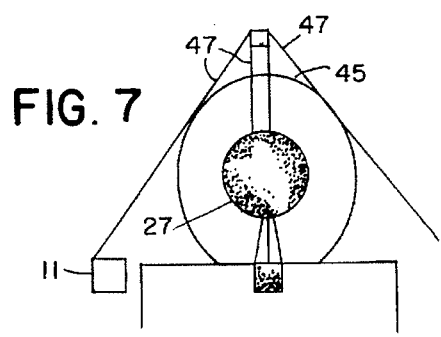
FIG. 7 is a frontal view of the system shown in FIG. 6.

In FIGS. 6 and 7, the transmitter 9 and waveguide 3 are shielded from the surrounding environment. The conical horn antenna 13 extends outward from the side of a shield 45 and is connected to the waveguide 3. A lens 27 for focusing the beam is suspended in front of the conical horn antenna 13 by wire 47 or other supporting means connected to the shield 45. A third cable 49 extends from the end of the shield 45 an is connected to the power supply 35.

Figure 8:
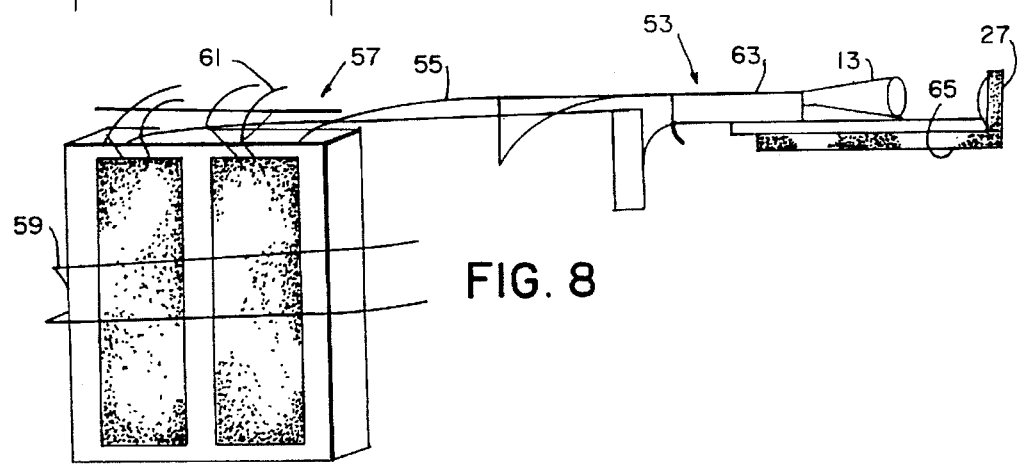
FIG. 8 shows an embodiment of the backpack AEPS for short range agricultural use.
Figure 6:
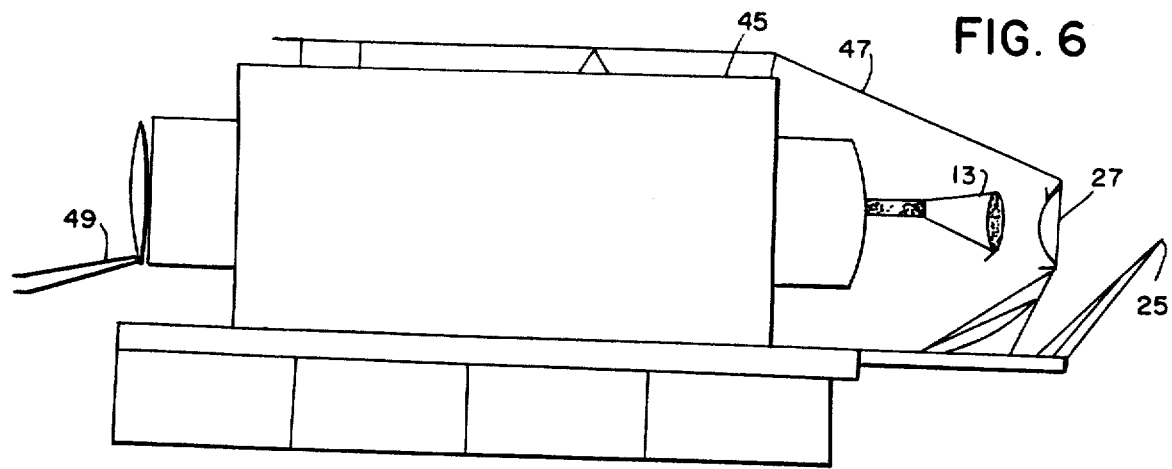
Figure 7:
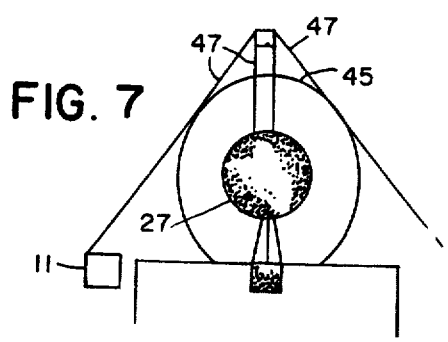
Figure 8:
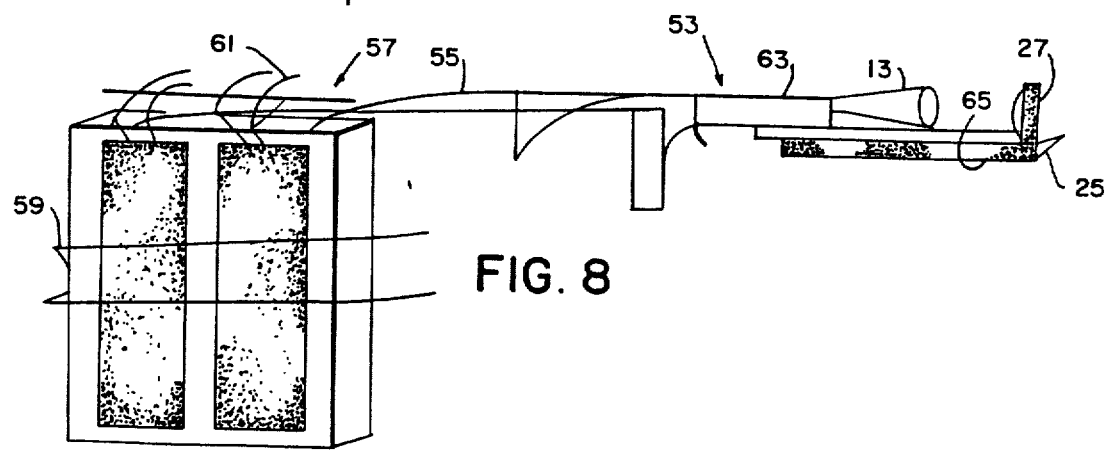

A utilitarian design for AEPS 1 is shown in FIG. 8. One embodiment of the backpack AEPS unit 53 has flexible coaxial cables 55 leading power from a battery pack 57 to the transmitter 9 and conducting a charge from the charge source 11. A second embodiment has an arrangement of induction coils running off the battery pack for providing a low current but high voltage charge to travel along the short-range channel 5 that is created. The battery pack 57 of the backpack AEPS unit 53 has a harness 59 and straps 61 for body attachment. The waveguide 3 is positioned inside a casing 63 to which the battery pack 57 is connected. The conical horn antenna 13 extends out of the casing 63 and is connected to the waveguide 3. A microwave lens 27 is positioned in front of the conical horn antenna 13 and is movably attached to an extension 65 connected to the casing 63. When a lower energy beam channel 5 is required, the lens 27 can be flipped down, allowing for a more divergent beam and reducing channel 5 effectiveness for charge transmission.

While the invention has been described with reference to specific embodiments, modifications and variations of the invention may be constructed without departing from the scope of the invention, which is defined in the following claims.

I claim:

1. A system for projecting energy using microwave radiation comprising a transmitter for generating microwave radiation, a waveguide connected to the transmitter by a first cable, for receiving and directing the microwave radiation from the transmitter, a power supply connected to the transmitter, an antenna connected to the waveguide for conducting and projecting microwave energy for exciting and heating gas molecules in a channel extending from the antenna, an electrode placed in the channel for releasing a charge into the channel, and an electric charge source, connected to the electrode by a second cable, for delivering a charge to the electrode.

2. The system of claim 1, further comprising a ground positioned near the channel for providing a release for the charge in the absence of the channel.

3. The system of claim 1, wherein the antenna releases microwave radiation at a frequency of 60 GHz.

4. The system of claim 1, wherein the transmitter further comprises solid state microwave amplifiers.

5. The system of claim 4, wherein the transmitter further comprises gallium arsenide microwave monolithic integrated circuit amplifiers.

6. The system of claim 4, wherein the transmitter further comprises high electron mobility transistor amplifiers.

7. The system of claim 1, wherein the transmitter further comprises tube based sources.

8. The system of claim 7, wherein the transmitter further comprises a gyromonitron oscillator.

9. The system of claim 7, wherein the transmitter further comprises a gyrotron based traveling wave tube amplifier.

10. The system of claim 7, wherein the transmitter further comprises a gyroklystron amplifier.

11. The system of claim 7, wherein the transmitter further comprises an array of klystron amplifiers.

12. The system of claim 7, wherein the transmitter further comprises an array of magnetron amplifiers.

13. The system of claim 1, further comprising a microwave lens, positioned between the antenna and the electrode, for reducing divergence of the channel.

14. The system of claim 13, wherein the microwave lens is rotatably positioned for altering charge transmission.

15. The system of claim 1, wherein the antenna is a conical horn antenna having an aperture for connecting the antenna to the waveguide.

16. The system of claim 15, further comprising a transparent window positioned on an outer edge of the conical horn antenna.

17. The system of claim 1, further comprising a cooling jacket fitted around the waveguide and the antenna for externally cooling the system when the waveguide is pressurized.

18. The system of claim 1, wherein the waveguide and transmitter are surrounded by a shield for protecting the system from atmospheric interference.

19. The system of claim 18, wherein wires are attached to the shield and a microwave lens is suspended on wires between the antenna and the electrode.

20. The system of claim 1, wherein the electric charge source is a bank of capacitors charged in parallel and discharged serially.

21. The system of claim 1, wherein the electric charge source is selected from the group comprising modified spark plugs, tesla coils, arc welding nozzles, and banks of charged capacitors.

22. A system for projecting microwave radiation comprising a battery pack, a harness and straps connected to the battery pack for travel attachment, a transmitter connected to the battery backpack by a first flexible coaxial cable that carries power from the battery backpack to the transmitter, a waveguide connected to the transmitter by a second cable, a conical horn antenna connected to the waveguide for projecting a channel of excited molecules, an electrode positioned in the channel for releasing a charge into the channel, a charge source connected to the electrode by a third cable and connected to the battery pack by a second flexible coaxial cable, and a casing for holding and carrying the transmitter, waveguide and charge source.

23. The system of claim 22, wherein induction coils extend off the battery pack for providing low current and high voltage charge.

24. A system for projecting thermal or electrical energy using microwave radiation comprising a transmitter for generating 60 GHz microwave radiation, a waveguide connected to the transmitter by a first cable, for receiving and directing the microwave radiation from the transmitter, a power supply connected to the transmitter by a second cable, a conical horn antenna, connected to the waveguide, for conducting and projecting a channel of excited, heated air molecules, an electrode positioned on the channel projected by the antenna for releasing a charge into the channel, an electric charge source connected to the electrode by a third cable for delivering the charge to the electrode, a ground positioned near the channel for providing a release for the charge, and a cooling jacket fitted around the waveguide and the antenna for externally cooling the system when the waveguide is pressurized.

25. A method for projecting energy comprising the steps of generating microwave radiation pulses, projecting the radiation pulses through a channel extending into air, exciting gas molecules in the channel for energizing the channel into a conductor, and releasing electric charge into the channel.

26. The method of claim 25, further comprising sealing an AEPS and pressurizing a waveguide in an AEPS with inert gases for increasing microwave pulse power.

27. A system for projecting energy comprising a transmitter for generating microwave radiation, an antenna connected to the transmitter for projecting the radiation in a channel extending into air and exciting gas molecules in the channel for energizing the channel into a conductor, and an electrode in the channel for releasing electric charge into the channel.

28. The system of claim 27, further comprising a waveguide connecting the transmitter and the antenna, and inert gas in the waveguide for pressurizing the waveguide and thereby increasing microwave pulse power.

* * * * *

UNITED STATES PATENT AND TRADEMARK OFFICE
CERTIFICATE OF CORRECTION

PATENT NO. : 5,624,592

DATED : April 29, 1997

INVENTOR(S) : Philip J. Paustian

Page 1 of 2

It is certified that error appears in the above-identified patent and that said Letters Patent is hereby corrected as shown below:

In the Drawings:

Replace Figures 6, 7 and 8 with the attached correct formal drawings.

Signed and Sealed this

Second Day of June, 1998

BRUCE LEHMAN

Attest:

Attesting Officer

Commissioner of Patents and Trademarks